Aug. 4, 1942.  E. W. PITMAN  2,292,156
HEAT CONTROL
Filed July 7, 1939
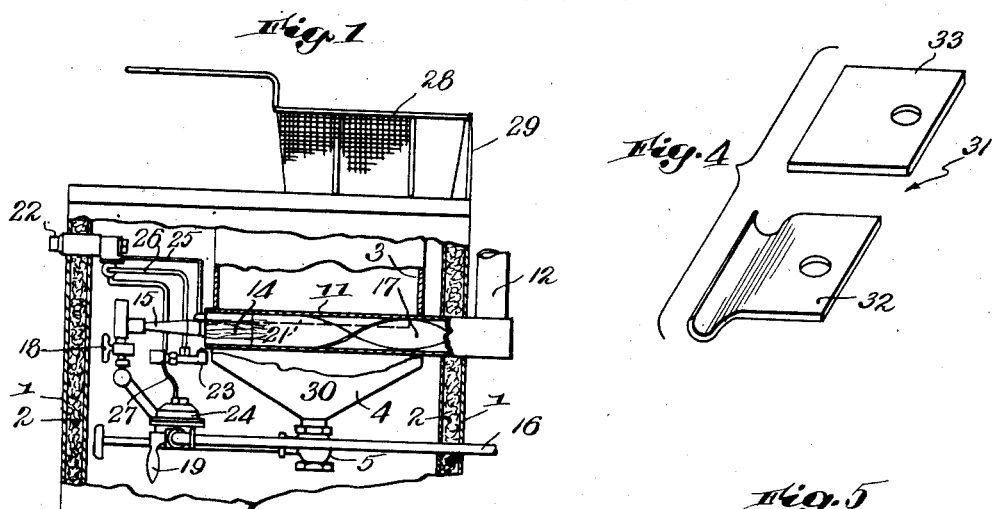
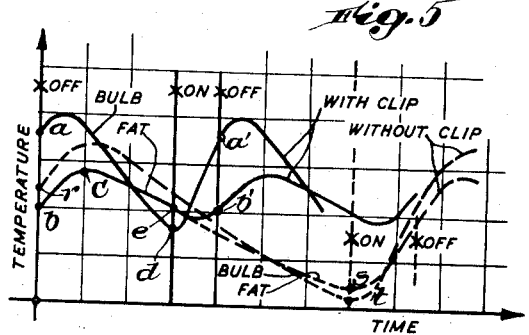
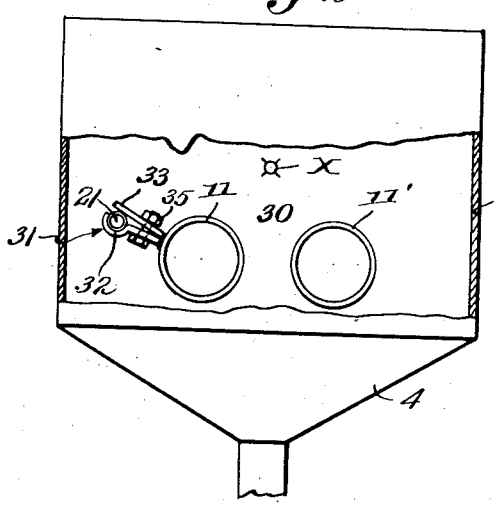
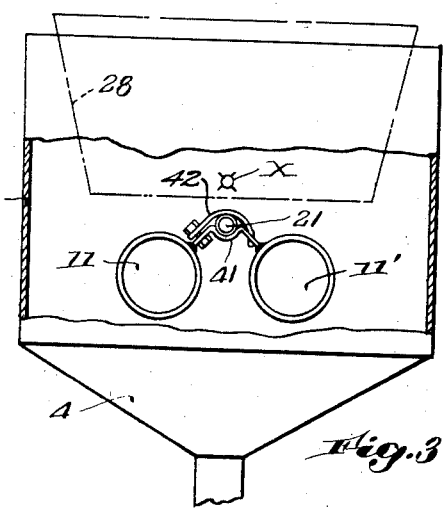
Inventor:
Eugene W. Pitman
by Roberts, Cushman & Woodbury
his Attys.

Patented Aug. 4, 1942

2,292,156

UNITED STATES PATENT OFFICE 2,292,156

HEAT CONTROL

Eugene W. Pitman, Saugus, Mass., assignor to J. C. Pitman & Sons, Inc., Lynn, Mass., a corporation of Massachusetts Application July 7, 1939, Serial No. 283,136

3 Claims. (Cl. 53—7)

The present invention relates to the temperature control of heating apparatus, and especially to the temperature control of the cooking medium used in such apparatus.

Deep fat frying devices have containers for the cooking medium, as fat or oil, and, for most efficient performance, heaters arranged within this medium. The effective temperature of such devices is usually controlled by means of thermostats having temperature responsive elements within the medium and arranged for terminating or diminishing the heat supply when the medium has reached a certain temperature, and for resuming it upon a subsequent decrease of that temperature.

Devices of this type require an unobstructed zone in the medium, where the cooking takes place; hence, the temperature responsive element in most instances has to be located outside of and at some distance from this cooking zone.

Heretofore, the temperature detecting part of the thermostatic equipment of such apparatus had no direct contact with heated parts or was fastened to the container for the cooking medium or a part having a similar thermic relation to the medium; such equipment has the defect that it does not respond in the most effective manner to temperature variations in the cooking zone of the medium, the difference between the temperatures prevailing in that zone at the moment when the heat supply is connected and disconnected, respectively, being for many purposes too great, and the time between starting and terminating the heat supply too long. This comparatively great temperature difference and the comparatively long cooling periods are especially disadvantageous when operation of the apparatus necessitates sudden cooling down of the medium, as for example by inserting cold food to be fried.

Principal objects of the present invention are to provide improved equipment for controlling the supply of heat to heating or cooking medium, to provide quickly and reliably responding control of the temperature of such medium, to provide for response of the heat supply to such medium to comparatively small temperature changes, to provide deep fat frying equipment which cooks quickly, rapidly sears inserted food and hence avoids greasy products, which is not detrimentally affected by the insertion of cool food to be cooked, which maintains the heating medium at comparatively very even temperature, and which accomplishes these requirements in simple and certain manner, and without substantial increase in manufacturing costs.

These and other objects, features and aspects of the invention will be apparent from the following description of a practical embodiment illustrating the genus of the invention with reference to a drawing in which:

Fig. 1 is a side elevation of a deep fat frying device partly in section and with parts of the housing broken away;

Fig. 2 is a front view of the frying kettle with part of the wall broken away;

Fig. 3 is a view similar to Fig. 2 showing another way of applying the invention;

Fig. 4 is a detail of the clip shown in Fig. 2; and

Fig. 5 is a diagram illustrating the operation of a device according to the invention.

Figs. 1 and 2 show a casing 1 with heat insulation 2 supporting container 3 having a cool sediment zone 4 with drain valve 5. A tube or tubes 11, open on both ends, traverse the vessel and lead with one end into a flue 12. The other end of the tube receives the flame 14 of burner 15, for example a gas burner supplied with gas from connection 16, and with air through appropriate openings in the housing. A helical baffle 17 provides for efficient and even distribution of the heat supplied to tubes and cooking medium in vessel 3, and also for cooling the tubes.

The gas supply can be manually controlled by means of cock 18 and main valve 19, or automatically by way of thermostatic equipment having a tubular temperature detecting bulb 21 filled with expansible medium, thermostat control element 22, pilot burner 23, diaphragm cut-off valve 24 and connecting tubes 25, 26 and 27. This thermostatic equipment is of standard construction, valve 24 shutting off or reducing the gas supply when the medium in 21 has expanded to a certain degree, the operating temperature being adjustable by means of control element 22. When the cooking medium in container 3 cools off and the thermostatic agent contracts accordingly, the gas is again turned on. In actual practice, there will usually be a difference in the temperatures at bulb 21 when the gas is shut off, or turned on, respectively.

As indicated in Figs. 1 and 3, the customary basket 28 with hanger 29 may be provided for inserting food into, and removing it from container 3 filled with fat or oil 30.

According to the invention, the temperature detecting thermostat element is connected to a heat supplying element by means of a heat conductor; for example, bulb 21 is connected to tube 11 by means of clip 31, as shown in Fig. 2. The clip may consist of a hanger 32 (Fig. 4) and a plate 33. The hanger may be welded to heater tube 11 (Fig. 2) and the thermostat element clamped thereto by means of the plate, with screw 35. Instead of connecting it to a single tube, the bulb may be similarly fastened to two or more heat supplying elements. Such an arrangement is shown in Fig. 3 where 11 and 11' are two heater tubes, 41 a holder having two holes and welded to the two tubes, and where 42 is a clamp plate inserted with a pointed end into one of the holes of the holder and screwed tight around the thermostat element through the other hole. As shown in Figs. 1, 2 and 3, heater tubes 11, 11' are so arranged relatively to the cooking region that, during operation, they will always be covered with cooking medium, and the bulb 21 is mounted at substantially the same level as the heater tubes so that its effective portion will likewise be always in contact with the medium.

Prior to initial use for frying, the thermostatic equipment is set at the desired position by adjustment of the control element 22 under operating conditions, a thermometer bulb being placed in the cooking medium at cooking zone X, Figs. 3 and 4, while the temperature of the fat is increased through operation of the burners, the final adjustment of the control element 22 being such that it reacts to shut off the gas supply when the thermometer shows that the temperature at cooking zone X has reached a certain value, for example 400° F., depending upon the food to be cooked.

The operation of the above described embodiment of the invention after such setting will now be described.

Starting with the cooking medium below the desired cooking temperature and the gas supply and flame on, the flame playing into tubes 11 quickly brings the fat to the desired temperature, the tubes heating rapidly and with conservation of heat due to the baffle plate arrangement. When the desired cooking temperature is reached at the effective cooking zone X, the thermostat by its prearranged setting will turn off the gas supply. It will be evident that the temperature of the tubes will be considerably higher than that of the fat at the effective zone X and that, upon turning off the gas supply the fat temperature will further rise due to heat transfer from the hotter tubes and associated parts. Assuming for example that the gas is turned off when the fat at zone X is at 400°, the fat temperature at that point will rise for a short time, for example to about 405° in about two minutes with a certain type of actually used apparatus. When the gas is turned off, the thermostat bulb will have a temperature higher than that of the fat at zone X but much lower than that of the heating tube to which it is attached. After the turning off of the flame, comparatively cool air is drawn through tubes and flue, and will begin to cool the tube 11 and through it the thermostat bulb 21 which is in heat conductive relation therewith through clip 31. By the time when the fat at zone X has reached its maximum temperature, the bulb temperature is probably already decreasing; at any rate, during the following period when the fat at zone X cools down, the heater tubes and the thermostat bulb will cool at a faster rate, due to the above-mentioned cooling effect, which is assisted by the baffles. Due to these conditions, the bulb will have reached the temperature at which it causes the gas to be turned on, at a time when the fat at zone X has not yet cooled down to the bulb temperature; in the above example, this will take about six to eight minutes and the fat temperature will be only very slightly below the temperature of 400° at which the gas was turned off, namely at about 398 to 399°. The flame having been started, tubes 11 and bulb 21 heat up again much more rapidly than the fat at the effective zone, as explained before, and the shutting off temperature will be reached when the fat at that zone is cooler than the bulb, namely about 400°. This operating cycle, as so far described, has not been complicated by a cooling of the fat due to immersion therein of food to be cooked; this, so to speak idling operation is very advantageous because it keeps the cooking zone temperature practically constant during periods when the frying apparatus is ready for, and awaiting use. However, as will be discussed hereinafter, a similar cycle can be maintained even if refrigerated food is inserted at minimum intervals.

It will be evident that this working cycle will depend a great deal upon the general nature of the heating apparatus, the heating elements, the volume of medium used, the desired temperature, the thermostatic equipment, the outside temperature, and other factors but, generally speaking, the temperature at the thermostatic control element in heat conductive relation to the heating elements will, at the time when the heat supply is discontinued, have a temperature $a$ (compare Fig. 5) higher than temperature $b$ of the medium at the effective cooking zone. During the ensuing "off" period, the temperature of the medium will first "over run" somewhat, that is rise to a higher temperature $c$, due to the heat stored in the apparatus. At this time, the heater element will already be in the process of being cooled by the air flowing therethrough, so that the thermostatic detecting element cools off quicker than the medium. At $d$, the detector has been cooled down to the temperature at which the heat supply is reconnected, the medium having by that time reached a temperature $e$ practically equal to, or only slightly different from the shutting off temperature $a$. During the "on" period, both the medium in the effective region and the detector element will quickly become hotter, but the detector at a much faster rate because of its connection to the heater element. The shutting-off temperature will again be reached at $a'$, when the medium has reached temperature $b'$.

Fig. 5 also shows, by way of comparison, the operation of a similar device but with the thermostat bulb immersed in the medium without effective connection to a heat supplying structure. In that instance, the bulb, for example fastened to the container wall, will have a temperature not much different from that of the fat at X during the heating period, so that the thermostat has to be set to shut off the gas when the bulb has reached temperature $r$ rather close to temperature $b$ at the cooking zone. As before, the fat will rise from temperature $b$ to $c$, but the bulb temperature will change at about the same rate with the fat temperature at zone X, so that (assuming that the same thermostat is used as before, only the effective range being moved from $a$—$d$ to $r$—$t$) the bulb temperature at which the gas is turned on is only reached at $t$, when the fat will have a comparatively low temperature $s$. It is evident that the range of temperature limits is much narrower with my new arrangement, the temperature variation of the medium being only a little greater than the "over run"

temperature rise of the medium during the "off" period, and the temperature of the medium being essentially the same at the beginning and termination, respectively, of the "on" or heating period.

This operating characteristic also prevails, and is particularly advantageous under practical conditions when food is immersed in the fat, lowering the fat temperature by as much as 10° to 30°. If food should be inserted during the "off" period, my equipment, due to its higher turning on point, will immediately turn on the heat whereas, with the old equipment, if the food happens to be immersed soon after the gas is shut off, it would take a comparatively long time until the detecting element, whose temperature follows rather closely that of the medium at the cooking zone, reaches its lower turning-on point, so that the food will for a certain time remain in medium of decreasing temperature.

If the food is inserted into a device controlled according to my invention during the "on" period, the temperature will be considerably higher as compared to conventional apparatus set for the same "off" temperature, during that entire period, excepting only a comparatively very short time just before the turning-off point.

In either case, my equipment provides at all times a maximum initial temperature, which is very important in deep fat frying because the surface of the food should be immediately seared at high temperature, in order to avoid absorption of fat, which renders the food less crisp, but greasy, and also increases the consumption of cooking medium. It will be evident that, in conventional equipment, the temperature during either the "on" or "off" period, may be rather low, so that this immediately high temperature searing can not take place.

Also, it will be apparent that, with a given maximum "off" temperature determined by the character of the food, apparatus according to the invention will cook quicker due to the maintenance of a higher average temperature, which circumstance reduces fuel consumption per unit of food and increases the output of cooked food, as compared to that of conventional equipment of similar capacity.

It will also be understood that by varying the length, cross section, material and the point of attachment of the clip, the operation of the thermostat can be correlated to the structure and manner of operation of the heating body, and the location of the zone requiring a certain temperature. For example, an especially well cooled heater tube might require a clip of lesser heat conductivity than a tube which remains hot for a comparatively longer period of time after the flame is shut off.

It should be understood that the present disclosure is for the purpose of illustration only and that this invention includes all modifications and equivalents which fall within the scope of the appended claims.

I claim:

1. Frying apparatus comprising a container for cooking medium to be heated, a heating conduit leading through said container, a burner directed into one end of said conduit the other end forming a discharge passage, a thermostatic detector immersed in said medium, means controlled by said detector for shutting off and starting said burner at given temperatures, respectively, and heat conducting means connecting said conduit and said detector below the surface of said medium, for conducting heat from said conduit towards said detector when the conduit is hotter, and from said detector towards said conduit when the conduit is cooler than the detector, due to the passage through the conduit of combustion gases or air, respectively.

2. Frying apparatus comprising a container for cooking medium to be heated, a heating conduit leading through said container, a heat transfer promoting baffle within said conduit, a burner directed into one end of said conduit the other end forming a discharge passage, a thermostatic detector immersed in said medium, means controlled by said detector for shutting off and starting said burner at given temperatures, respectively, and heat conducting means connecting said conduit and said detector below the surface of said medium, for conducting heat from said conduit towards said detector when the conduit is hotter, and from said detector towards said conduit when the conduit is cooler than the detector, due to the passage through the conduit and baffle of combustion gases or air, respectively.

3. Frying apparatus comprising a container for fat to be heated, a heating tube leading from one wall of said container to another, a burner directed into one end of said tube the other end forming a discharge passage, a thermostatic bulb immersed in said fat, means controlled by said bulb for shutting off and starting said burner at given temperatures, respectively, and a metal strip connecting said bulb to said tube at approximately the level of said tube below the surface of said fat, for conducting heat from said tube towards said bulb when the tube is hotter, and from said bulb towards said tube when the tube is cooler than the bulb, due to the passage through the tube of combustion gases or air, respectively.

EUGENE W. PITMAN.